United States Patent
Essafi et al.

(10) Patent No.: US 6,642,929 B1
(45) Date of Patent: Nov. 4, 2003

(54) IMAGE SEARCH METHOD, BASED ON AN INVARIANT INDEXATION OF THE IMAGES

(75) Inventors: Hassane Essafi, Orsay (FR); Jean-Michel Marie-Julie, Haarlen (NL)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/700,876
(22) PCT Filed: Jun. 14, 1999
(86) PCT No.: PCT/FR99/01402
§ 371 (c)(1), (2), (4) Date: Jan. 16, 2001
(87) PCT Pub. No.: WO99/66426
PCT Pub. Date: Dec. 23, 1999

(30) Foreign Application Priority Data

Jun. 15, 1998 (FR) .............................. 98 07494

(51) Int. Cl.$^7$ .............................................. G06T 11/60
(52) U.S. Cl. .................. 345/581; 382/282; 382/249; 707/6
(58) Field of Search ................. 345/581, 582, 345/419; 382/249, 282, 283; 707/6

(56) References Cited

U.S. PATENT DOCUMENTS

| | | | | |
|---|---|---|---|---|
| 5,384,867 A | * | 1/1995 | Barnsley et al. | 382/249 |
| 5,781,899 A | * | 7/1998 | Hirata | 707/6 |
| 5,809,169 A | * | 9/1998 | Rezzouk et al. | 382/199 |
| 5,862,263 A | * | 1/1999 | Kim et al. | 382/249 |
| 5,867,603 A | * | 2/1999 | Barnsley et al. | 382/249 |
| 5,945,997 A | * | 8/1999 | Zhao et al. | 345/581 |
| 5,946,479 A | * | 8/1999 | Sakaguchi et al. | 716/20 |
| 6,522,780 B1 | * | 2/2003 | Pass et al. | 382/170 |

FOREIGN PATENT DOCUMENTS

FR    2753820    9/1996

OTHER PUBLICATIONS

Davoine, Antonini, Chassery, & Barlaud, "Fractal Image Compression Based on Delaunay Triangulation and Vector Quantization", vol. 5, No. 2, Feb. 1996, 5 pages.

Fisher, "Fractal Image Compression", vol. 2, No. 3, 8 pages.

* cited by examiner

Primary Examiner—Mark Zimmerman
Assistant Examiner—Huedung X. Cao
(74) Attorney, Agent, or Firm—Thelen Reid & Priest LLP; Robert E. Krebs

(57) ABSTRACT

Efforts are made to construct a digital index that represents properties or the appearance of portions of an image so as to automatically rediscover in it a sample of the image during a subsequent search, after having set up a sample index in the same way and having compared the indices while searching for similarities. In this invention, the mesh dividing up the image or the sample into portions is founded on points of interest and is not uniform, and the index is made up of information coming, for each portion, from this same portion or from a specified assembly of neighboring portions. Furthermore, a redundant mesh is proposed (FIG. 9A) in order to describe the image several times and to attenuate the consequences of any omissions from the points of interest (E) on the other modeling (FIG. 9B).

11 Claims, 4 Drawing Sheets

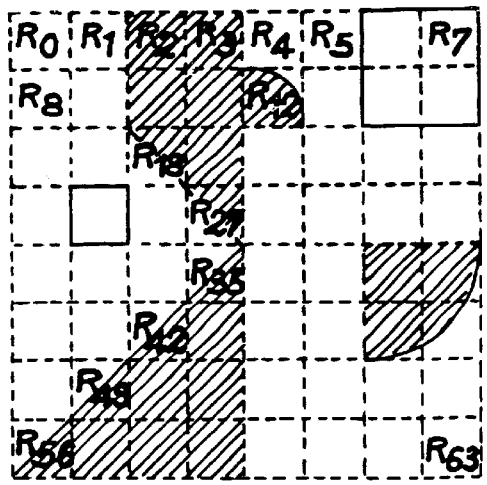
FIG. 1
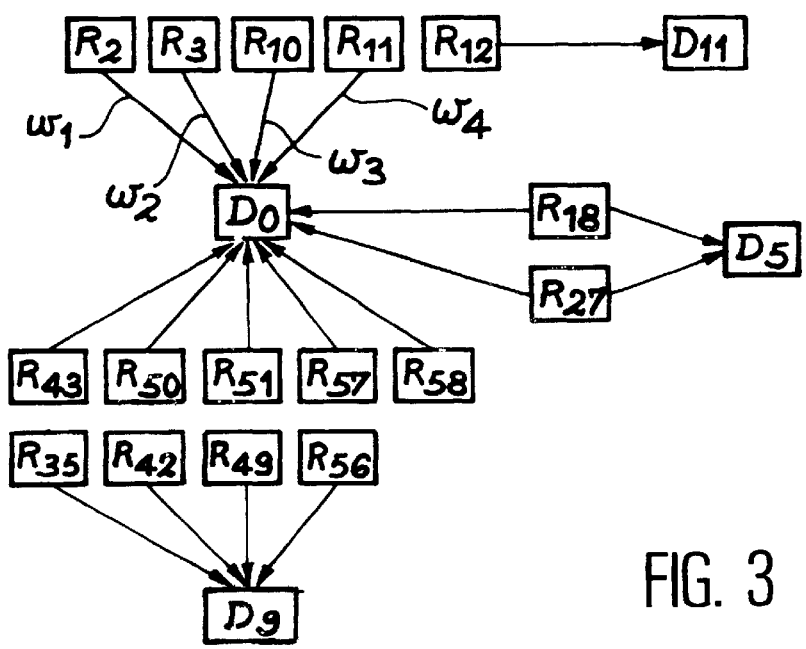
FIG. 2
FIG. 3

IMAGE SEARCH METHOD, BASED ON AN INVARIANT INDEXATION OF THE IMAGES

CROSS REFERENCE TO RELATED APPLICATION

This application is a national phase of PCT/FR99/01402 which was filed on Jun. 14, 1999 and was published by the International Bureau in English on Dec. 23, 1999.

FIELD OF THE INVENTION

The invention relates to a method of searching for images, each one of which has been recorded in a data base in the form of a structured information index and in a way that favors a subsequent search for a specified element in the images of this data base.

A simple technique used to search for a specified detail in an image consists of consulting a catalogue that describes the image using text or using key words, but the drawing up of the catalogue takes time and it is not possible to guarantee that the images will be described with objectivity and that the details in which one will be interested in the future will be perceived at the time. Finally, the description will not generally be precise enough since the details will generally be identified by their category (building, vehicle, individual person, etc.) while in general a particular individual item will be asked for from this category, which will require examination of all the images in which this category of elements is present.

Another solution consists of looking for an object by describing its outline shape and its texture and looking for this in the data bank of images. It is then necessary to extract the corresponding information on digital modeling of the images broken down into points. Unfortunately, no extraction method exists for the outline or texture of an object which is effective in all cases, and these methods result in failure when the objects are partially masked or when they are illuminated to different extents in the sample provided for the search and in the image in which this sample must be discovered.

Another method consists of comparing the sample provided with each of the parts of each of the images, the comparison resting on the tints of the points of the sample and the points of the images. However, this method is impractical for a search that is at all large.

A final category of methods, to which the invention belongs, consists of modeling the images by means of an index that represents characteristics of the image. The sample to be looked for will be modeled in the same way in order to give an index in analog form and the comparison will rest on the indices. If a comparison is judged to be positive, the corresponding image will be extracted and examined.

Recently there has been much interest in the compression of images using their fractal properties, in order to provide indices which occupy little memory space while permitting subsequent reconstruction of an image of satisfactory quality; these indices can, as will be seen, be used in the invention for comparisons leading to the search for samples provided that certain precautions are taken when they are drawn up.

A fractal object has the property of being identical to its parts: if a fragment of it is isolated and enlarged, it is found to be identical to the initial object. The image of a fractal object can be obtained by applying certain geometrical transformations repeatedly to a starting image, which is then deformed to converge towards the image of the fractal object that is called the attractor of the geometric transformation. The starting image can be chosen in any fashion whatsoever.

Normal images are not fractal images, but it is nevertheless possible to find quite simple geometrical transformations for which these images are attractors. The image can then be reconstituted by simply knowing an index that expresses these geometric transformations and applying these transformations several times to any starting image whatsoever: it is then enough to simply record the index in the data base, without it being necessary to record the image itself in digital form, which would take up much more space.

In practice, the geometric transformations are determined by dividing the image into sectors or ranges and making a domain of the same image, that is to say another part of the image, correspond to each of these ranges. In practice, this other part of the image has a greater surface area since suitable geometric transformations should contract or shrink the details on which they act. The correlations by which the ranges and the domains are made to relate to one another are chosen so that the domains resemble the ranges with which they are associated, that is to say that they have a similar appearance once they have possibly had certain modifications made to them, modifications of luminosity, contrast and color, or modifications of shape through rotation or through symmetry.

It is essential that the indices of the images and the samples in these images to be looked for, are at least partially composed in the same way, that is to say that homologous ranges are related to homologous domains, so that they are comparable. With regard to this, an important risk is linked to the sizes of the image and the sample which are often very different the domains and ranges that are made to correspond in the sample through a fractal transform are generally close to one another, while in a large size image they can be much further apart; corresponding ranges of the sample and the image will then be associated with different domains, that of the index and the image being outside the sample if precautions have not been taken.

It is not then possible for corresponding parts of the sample and image indices to be identical, and the search will be unfruitful if this circumstance occurs too often. With regard to this, one should make it clear that the domains associated with one and the same range by the indices of the sample and the image are chosen arbitrarily in most of the known methods, which means that these domains are generally different in any case and that the presence of the sample in the image should be taken as being probable if just a few fragments of their indices are identical. However the disadvantages of this situation are much more accentuated if the problem indicated above has not been resolved.

French patent application No. 96.11751 of the Sep. 26, 1996 provides one solution: a decision is made to limit the distance between each of the ranges of the images and the domains which are respectively associated with them through the index. This enables one to associate a specified range with identical domains of the image and of the sample with greater probability. The risks of an unfruitful comparison of the indices when the sample is indeed present in the image being examined are thereby reduced.

However, other risks of failing to make a comparison are not avoided by proceeding in this way: since the geometric transformations are normally defined by Cartesian co-ordinates which express the distance between the ranges and the domains related to them, the comparison will not be possible if the sample and the image are viewed from different angles and therefore have different co-ordinate axes. It is also necessary to ensure that the division of the sample and the image into domains and ranges are comparable without dividing up the image or the sample in too arbitrary a fashion, that is to say by avoiding splitting the essential details or by associating very different portions of elements inside one and the same domain or one and the same range.

BRIEF DESCRIPTION OF THE INVENTION

The invention has been designed to remedy these difficulties. It consists of combining certain techniques of the art of modeling images—some of which are known individually—with a method of composing the index, the idea of which resembles that of the previous application but which is less arbitrary and more methodical, so as to construct the indices in a substantially invariant fashion, that is to say independent of any interference which could affect the image. Hence, the indices of the sample to be looked for and the images in which it is present will resemble one another even if the images have been subject to noise and if the sample does not appear in the same way.

Noise, defects and interference of the images exert an influence that is just as great on the indices based on properties other than the fractals. The objective of the invention is to be free from this influence to a large degree by making the indices invariant or independent of slight interference which can affect the images and compromise the comparisons.

Instead of the divisions of the image being arbitrary and regular, as is the case in numerous methods where the image is divided into similar rectangles, the divisions are defined by points of interest which correspond to places where the images have properties which vary greatly and which, in practice, are generally positioned at the angles of details represented on the image. Hence these divisions better follow the outlines of the details and the properties extracted from their contents will be more homogeneous, which will allow them to be better defined and hence better compared with less uncertainty. Furthermore, by ensuring that the index is constructed either with the contents of the portion being considered or with that of neighboring portions, that is to say defined portions, an important arbitrary element in the construction of the indices is removed since it will no longer be possible to choose the domains and the ranges made to correspond by a fractal transform, which is beneficial to the quality of the image to be reconstructed but harms the comparisons.

However, this will not allow one to obtain an invariance of the indices since the points of interest, which are the basis for the non-uniform division of the image, are still sensitive to noise or other photographic conditions of the kind which cannot be avoided since they depend on the circumstances under which each image was created. The image divisions will be modified as a consequence and the invariance of the indices will therefore be affected. However, it will be seen that this harmful effect will be considerably attenuated if the intersections of the link lines are used as possible vertices of the polygons forming the portions of the image and if these polygons can partially or totally cover one another, encroaching one upon the other, something that is not retained in the usual methods where the indices are not used for the purposes of making comparisons but only to reconstruct the images.

The index itself can express fractal properties of the image. In this case, it conforms to the invention when the index expresses the relating of different portions of the image having comparable appearances, the different portions comprising the divisions of the image and sub-divisions of the image obtained by dividing up the divisions, each of the sub-divisions being related in the index with each of the divisions adjacent to the division which contains said sub-division, said adjacent divisions constituting said neighboring portions.

However, it can also express properties intrinsic to the portions of the image themselves. It is then proposed to express them in the index in the form of mathematical moments which permit the quantifying of these properties and contribute to ensuring the invariance of the indices. These moments are preferably sums, over each of the image portions, of terms calculated for each point of said image portion which are proportional to a parameter expressing one aspect of the point and to a power determined for a barycentric co-ordinate of the said point.

The barycentric co-ordinates can further be employed to calculate types of index other than mathematical moments, for example the Fourier transforms; their advantage is that they are linked to the shape of portions from division of the image, and therefore they stem indirectly from the points of interest and from the elements of the image, but not from either the orientation or the position of the elements in the image.

These aims, features and advantages of the invention as well as others, will be better be understood from the commentary to the Figures which follows and which is used to reveal the technical context and a particular embodiment of it

BRIEF DESCRIPTION OF THE DRAWINGS

FIG. 1 is a view of an image sub-divided into ranges;

FIG. 2 is a view of the same image divided into domains;

FIG. 3 is a graph symbolizing a fractal transformation index;

DETAILED DESCRIPTION

Figure 4:
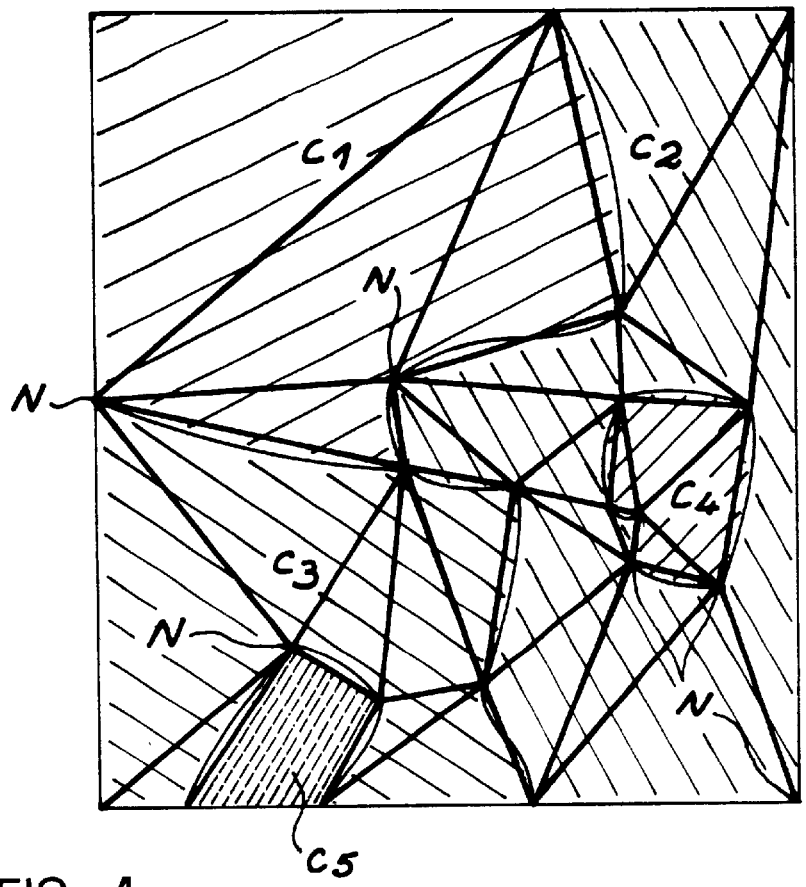
FIG. 4 is a view of a sub-division or division mesh of another image.

The general principles for compression of an image by an index expressing its fractal properties will be recalled: FIG. 1 represents an image, formed here from a mosaic of two colors with appearing on it a division into square ranges, numbered here in accordance with the horizontal rows from R0 to R63, by a grid. FIG. 2 represents a division of the same image into sixteen domains, numbered in the same way from D0 to D15 each one of which has the surface area of four ranges and like them a square shape.

This image of simple shape enables one easily to relate domains with ranges. Hence ranges R0, R1, R4, R5, etc. entirely white have a physiognomy identical to a domain that is entirely white such as D0 (or D3 or D14 for example);

the entirely black ranges such as R2 and R3 could be related to an entirely black domain such as D1 or D13, but one could also relate them to relationship with the domain D0, which has the same appearance with a change of luminosity; the ranges such as R18 and R27 split into black and white along a diagonal will be related to the domain D5 with the same appearance; R35, R42, R49 and R56 with D9 for the same reason; the range R12 will be related to the domain D11 which has the same appearance with a rotation of a quarter of a turn. One is content with imperfect similarities between domain and range in order to establish these relationships in practical situations.

This set of correspondence relationships can take the form of a graph, a part of which is given in FIG. 3. The application of the fractal transformation defined by the index consists, in concrete terms and starting with any starting image whatsoever that has been divided and sub-divided into sixteen domains and sixty four ranges, of constructing a new image in which, for each of the ranges one transfers, for each of the ranges, the content of the domain of the starting image which is associated with it by the graph and the index after having applied to it the required change of scale and possibly the modifications in luminosity, orientation etc. contained in the index. By repeating these operations, there is convergence towards the image in FIG. 1 whatever the starting image might be.

The transformations of a fractal kind which make up the index are therefore given by equation (1):

$Wi=(\gamma_i, x_i, y_i, tx_i, ty_i, s_i, o_i)$. In reality, one is concerned with writing a transformation $W_i$ in vector form, where $\gamma_i$ is an index designating an isometry from among a list previously drawn up, in order to pass from the domain to the associated range, such as a rotation, a reflection, a symmetry or a modification of scale; $x_i$ and $y_i$ are the position co-ordinates of the domain; $tx_i$ and $ty_i$ are the translation co-ordinates to pass from the domain to the associated range; and $s_i$ and $o_i$ are coefficients of contrast and luminosity which enable one to modify the levels of grayness in the domain to obtain those levels of the associated range. The coefficient of contrast $s_i$ permits one to regulate the difference in the levels of grayness of the points of a range by modifying the equivalent difference among the points of the domain which is associated with it, and the coefficient of luminosity $o_i$ allows one to lighten or darken the range in relation to the domain.

We will now begin an actual method of creating the mesh for the division of the image. The mesh of the preceding figure was regular and depended on the dimensions and the orientation of the edges of the image without either the position or the size of the details of the image being considered. If an object present in this image was moved, turned or represented on a different scale, it would therefore be divided in another way. As such differences of position and orientation of contents are inevitable between an image and a sample to be rediscovered, the boundaries of the ranges and domains would not coincide on the two representations of the object, and the indices to be compared would not be constructed in the same way. This is why it is proposed to replace such a mesh which is regular and depends on the edges of the image by an irregular mesh drawn up in relation to the content of the image. The development of the mesh then comprises two essential steps.

1) Firstly, mesh nodes, also called sites, are created, that is to say junction points of the lines dividing up the image. The mesh nodes will, in practice, be points of interest in the image, which various known processes enable one to detect. Each point of the image is characterized by exploiting notions of differential geometry such as measurements of gradient or of curvature, or $1^{st}$ or $2^{nd}$ order derivatives in several directions. Heuristics expressed from these values then enable one to classify each point. One digital detector is the Harris detector which is based on the calculation of the Hessian matrix H, produced from the image and convoluted with a Gaussian. The criterion for selection of the points of interest is based on the local maximums from the formula: $det(H)-k.Trace2(H)$, with $det(H)$=determinant of H, k=constant and $Trace2(H)$=square of the trace of H. Although one can imagine several ways of proceeding, one may consider the recognition of areas or patches of different colors on the image and position the nodes at the angles of the lines of separation between these patches and at the intersections of these lines with the edge of the image. An example is shown in FIG. 4, where four patches C1 to C4 are apparent, and the nodes are at the points of concurrence of the triangles (some have been given the reference N). It can be seen that the mesh is completely irregular, that is to say that the nodes are positioned at distances which are very different. It is recommended that the parts of the image which have too much texture are obliterated, that is to say the parts which have repeated variations in color over a small surface area, such as the detail C5 which has been removed from C3. Such areas are provided, for example, by grass, the sea or brick walls.

2) Next the divisions of the image are constructed from the nodes. These are polygons, the nodes of which are the vertices. A simple way of dividing has been proposed by Delaunay and is shown in FIG. 4: the polygons are all triangles. Here again, software enables one to construct a network of triangles from a network of nodes. It is obvious that other ways of proceeding are possible: one may proceed with different polygons and all the polygons might not have the same number of vertices.

This latter characteristic can arise from a process for correcting the mesh: adjacent polygons which comprise homogeneous regions or almost homogeneous regions of the image can be fused into a single region, which then has a greater number of sides, so as to simplify the mesh.

The fusing of polygons enables one to reduce the size of the index of the image by fusing together polygons having visual -characteristics that are close (having similar indices or characteristics). The resulting polygon will be considered to incorporate an area of intermediate appearance.

Figure 5:
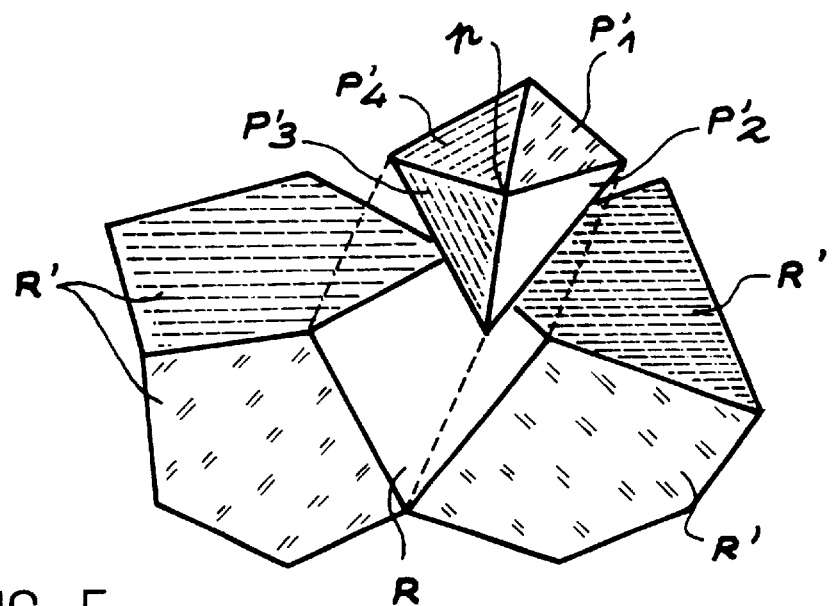
FIG. 5 illustrates a perfecting of the mesh creation technique.

Reference may be made to FIG. 5 for a specific explanation of a polygon fusion process and its consequences.

A polygon forming a range R of the modeled image, here a quadrilateral, is, in reality made up of three image parts with different levels of grayness which come together at a point P; the range R is seen to have a mean level of grayness, which is not very satisfactory since the image becomes blurred and the potential point of interest p has disappeared. This is why the simplified mesh at range R would be advantageously associated with a finer mesh, obtained before fusion in which the range R would be replaced by smaller polygons P'1, P'2, P'3 and P'4 which sub-divide it and accepts one side of the range R as a side and the point p as a vertex; here one is concerned with triangles each of which coincides with the range R on just one side and has two other sides leading to the point p. One could also, among other possibilities, model a quadrilateral in place of the two triangles P'3 and P'4 which are situated on the same portion of the range R.

It would also be possible to intervene in the opposite way, by detailing or dividing up more finely the mesh obtained originally: taking the diagram in FIG. 5, the mesh at range R would first be created and then the division of this range R would be decided in order to form the polygons P'1, P'2, P'3 and P'4. It would then be conceivable to alternatively apply one or more of these methods of fusion and division of the polygons of the mesh. The co-ordinates of the point of interest p created in this way could be chosen in a manner that provides the most clear division of the image, or could be arbitrary: the point p will then possibly be at the barycenter of the range R.

Fusing polygons permits one to reduce the size of the index and therefore increase the compression of the image while at the same time it is possible that certain useful details are erased, while dividing the polygons has the opposite effects. Hence use may or may not be made of one of these techniques or both of them may be used at the same time according to whether one wishes to give more emphasis to the quality of the reconstituted image or to its compression.

The above has been the explanation of characterization techniques using an index that one endeavors to make both succinct and faithful. However, the indices constructed in this way do not provide an adequate probability of success if they are used for the search for samples by comparison, even if, in the case of an index based on the fractal properties, one resorts to the condition of patent 96.11751 which reduces the arbitrary nature of the selection of the domains and ranges brought into correspondence with them. Additional measurements are therefore proposed that conform to improvements in the invention in order to adapt these techniques to the present application.

Figure 8A:
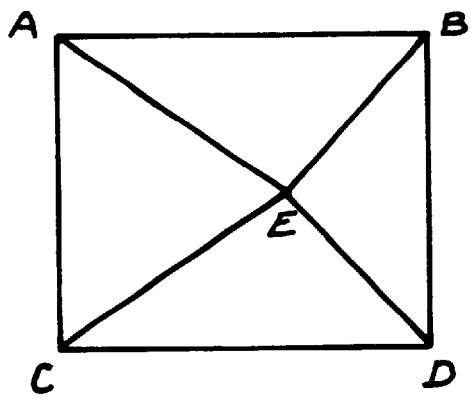
FIGS. 8A and 8B help to grasp the consequences of the instability of mesh points of the image, and FIGS. 9A and 9B help to explain how these consequences are reduced with the invention.
Figure 8B:
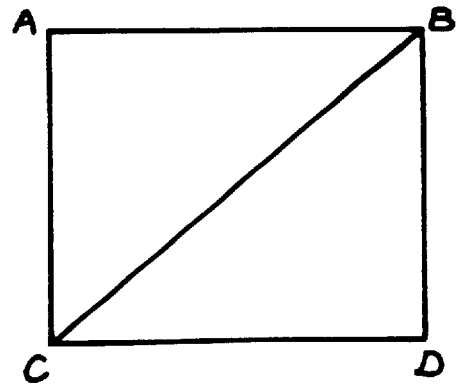

An important reason for the inadequacies of the techniques mentioned above arises from the selection of the points of interest: whatever they might be in general at particular places on the image, as angles of its principal details, it may be observed that the list of them is very sensitive to interference introduced by noise or by other causes. One may then find oneself in the situation of FIGS. 8A and 8B where an analog block is defined by five points of interest A, B, C, D and E in one case and by four (A, B, C and D) in the other, the point of interest E situated between the preceding ones, having been omitted. The mesh will allow division of the block into four triangles (ABE, BDE, ACE and CDE) in the first case and into only two (ABC and BCD) in the other, none of which coincide with the previous triangles. The indices describing the block will therefore be completely different and of no use for the comparison.

Figure 9A:
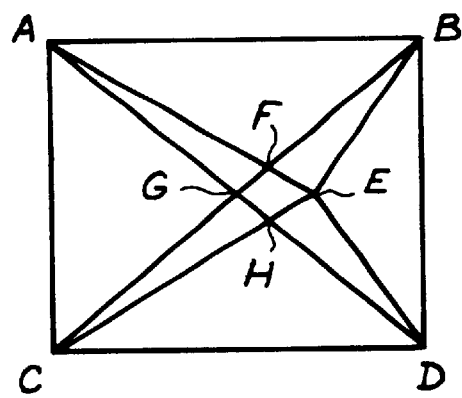
Figure 9B:
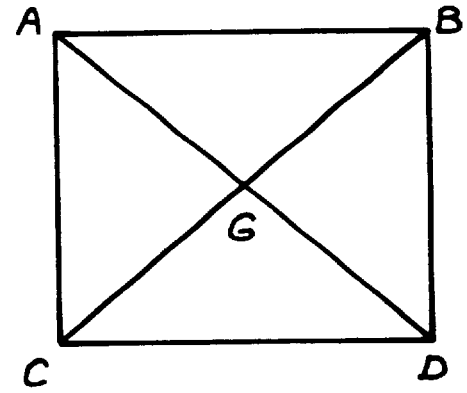

A method of remedying this disadvantage is the creation of a redundant mesh called a semi-exhaustive mesh, that is to say one in which the modeling polygons encroach into one another: FIGS. 9A and 9B represent such networks of triangles, formed in practice by joining all the points of interest-of the mesh that are closer than an accepted distance, by mesh lines and then taking as portions of the image to be indexed all the triangles formed by three of these mesh lines, in the case of the same points of interest as in FIGS. 8A and 8B. Such a method increases the probability of finding similarities between two images in which one and the same detail is present, even if points of interest have been omitted on one or the other modeling. In concrete terms, three new points of interest F, G and H at the intersections of the lines AE and BC, AD and BC, and CE and AD respectively appear and all triangles which include three of these points of interest A to H as vertices and whose sides are mesh lines, are accepted as triangles for modeling the image: here there are twenty one of them (ABC, ABD, ABE, ABF, ABG, ACD, ACE, ACF, ACG, ACH, ADE, BCD, BCE, BDE, BDG, BEF, CDE, CDG, CDH, CEF, DEH); the same modeling method, in the absence of the point E and as a consequence points F and H, enables the block to be modeled in eight triangles (ABC, ABD, ABG, ACD, ACG, BCD, BDG, CDG), much less numerous but all identical to certain of those from the mesh in FIG. 9A, which will permit the construction of indices that are partially identical and hence comparable since it is enough for a specified percentage of lines in the indices to be similar to judge that the comparison is positive.

The improvement relating to the use of the semi-exhaustive mesh is not appropriate to the compression of the image and demands much longer calculation times for coding into the index, but it is justified in this application.

If the image must be reconstructed from an index, it is preferable to use an ordinary index produced from division of the image without any overlapping of the polygons. The data base will then contain two indices for each of the images, one of which will be used for the sample search and the other for its reconstitution.

Even if the points of interest can easily be omitted when the image is disrupted, they tend to preserve an invariant assembly arrangement since they depend on the shape of the elements of the image: if these elements are to be found in different positions on the two images, the points of interest will be displaced in groups and the areas surrounded by these groups will be modeled in the same way, by similar portions. The mesh defined by points of interest therefore not only encourages division of the image into portions that are more homogeneous which would be an advantage for the compression of images but also the searches carried out from these indices will remain fruitful even if the objective of the search is not in the same position or at the same angle of inclination on the image and on the sample.

Figure 6:
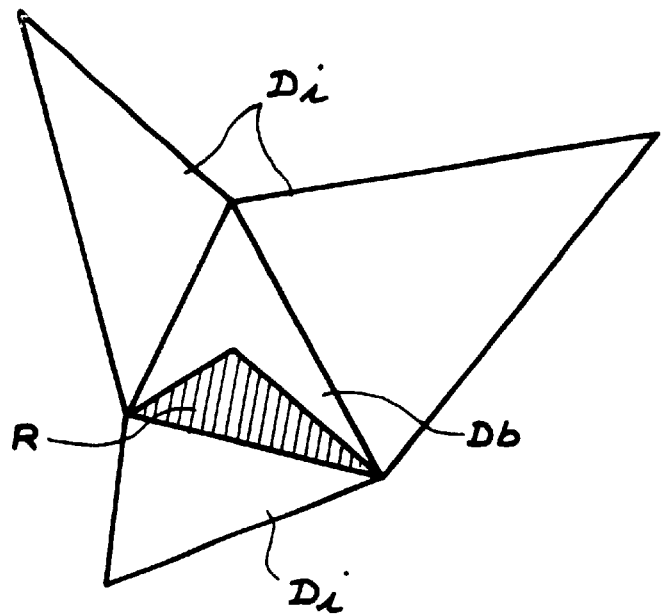
FIG. 6 is a diagram of a part of a mesh that explains a fundamental element of the invention.
Figure 7:
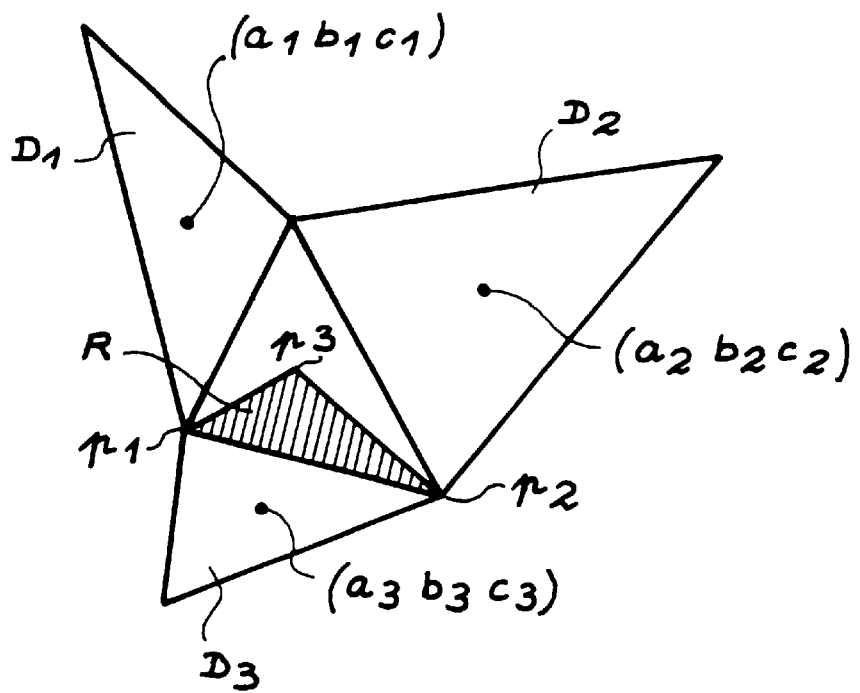
FIG. 7 is analogous to FIG. 6 and illustrates another aspect of the invention.

However, as the indices set up with the fractal properties are not associated with image ranges but with relationships between ranges and domains, an identical mesh is not sufficient to guarantee fruitful comparisons between a sample and an image, since it is necessary that the identical ranges are associated with identical domains. Another characteristic of this embodiment, which will now be described in connection with FIG. 6, provides a solution to this difficulty. Domains D of the modeling of the image are represented here, which are sub-divided into ranges R. Domains and ranges are assumed to be triangular but the method proposed here is applicable to any polygonal shape. The index for the fractal transformation of the image, can be established by associating with each of the ranges R, the set of domains (Di) which are adjacent through sides to the domain (Db) to which the range R belongs, the number of which is equal to that of the number of sides of domain Db. It can also be established from the breakdown of the image into polygons taken as domain blocks; the dividing of the range into blocks is obtained by dissociating each triangle from three other triangles by using the barycenter to the starting triangle; each range triangle is characterized by using the domain triangle that contains it. It can be seen that the index then becomes entirely defined by the shape of the mesh and therefore that the very similar indices could always be obtained for one and the same object present in different images on condition that a method of creating the mesh is chosen that only depends on the contents of the image such as the method which has been explained above.

The index may consist, as is usual, of a collection of values corresponding to the parameters of equation (1), that is to say, values that indicate, in particular, the Cartesian co-ordinates $x_i$ and $y_i$ of each of the starting domains Di and the translation co-ordinates txi and tyi which lead from these domains Di to the range R which is associated with them. This way of proceeding has the disadvantage however that the x and y co-ordinates depend on the position of the object in the image and that the co-ordinates tx and ty depend on the orientation of the object in the image. It is therefore proposed to use different parameters, and, in particular to use barycentric co-ordinates for each of the ranges R in order to further reinforce the invariance of the indices.

The barycentric co-ordinates of a group of points, such as the vertices of a triangle (A, B, C) are numbers $\alpha$, $\beta$, $\gamma$ equal in number to that of the reference points A, B, C and which define the position of any point p by p=$\alpha$A+$\beta$B+$\gamma$C, as a function therefore of the points A, B and C. The relationship $\alpha+\beta+\gamma=1$ is respected on the perimeter of the triangle ABC and furthermore, $\alpha$, $\beta$ and $\gamma$ are all between 0 and 1 inside this perimeter.

The geometric transformations, which cause any two polygons with the same number of vertices to pass from a domain D to a range R, can be broken down into a translation, an isometry (rotation, symmetry, etc.) and a deformation. The index for the fractal transformation will then also have to contain digital coefficients that express the respective importances of these three operations for each of the relationships between domain and range, and the totality of these coefficients, if the index must be used to reconstitute the image in the way indicated above or at least a part of the coefficients if the index is only being used for comparisons. Whatever the case may be, the fractal transformation can be symbolized by a series of equations (2)

$$w(D_i) = \tilde{R} = \sum_{j=0}^{d-1} a_i^d \hat{a} j + s_i \ddot{o}(D_i) + t_i \quad (2)$$

where $D_i$ and R designate a domain and a related range, the index "~" signifies that the fractal transformation $w_k$ only enables one to reconstitute the range R approximately, $a_i^d$, $s_i$ and $t_i$ are the coefficients mentioned above for the geometric transformations, where $t_i$ quantifies the translation on the image, $s_i$ the isometry $\phi$ and $a_i^d$ the deformation. $s_i$ can be an angle value for a rotation, $t_i$ polar co-ordinates expressing the distance between the barycenters of the domain $D_i$ and of the range $\tilde{R}$ and the direction of a straight line joining these two points, and $a_i^d$ are coefficients giving barycentric co-ordinates of the range $\tilde{R}$ in relation to the barycentric co-ordinates $\alpha_j$ of the domain $D_i$; j finally designates the number of vertices of the polygons.

If domains D and range R are triangular, the equations (2) become:

$$w(D_{\hat{a},\hat{a},\hat{a}}^i)=\tilde{R}=a_i\hat{a}+b_i\hat{a}+c_i\tilde{a}+s_i\ddot{o}(D_i)+t_i \quad (3)$$

However, it conforms to the invention to incorporate in the index, the transformations w that relate all the domains $D_i$, adjacent to the domain $D_b$, to which the range R belongs, and this range R, so that the overall transformation that enables one to obtain the range $\tilde{R}$ is redundant and is made up of k equations (2) or (3), where k designates the number of domains $D_i$ which are relevant to providing the equations (4) starting from equations (3):

$$w_k\left(D_{\hat{a},\hat{a},\hat{a}}^{i=1,k}\right) = \tilde{R} = \sum_{i=1}^{k} \{a_i\hat{a} + b_i\hat{a} + c_i\tilde{a} + s_i\ddot{o}(D_i) + t_i \quad (4)$$

The fractal transformations $w_k$ can be expressed by vectors of co-ordinates (or matrices with k lines) v:

$$V=[(a_i),(b_i),(c_i),(s_i),(t_j)] \quad (5)$$

where i varies from 1 to the number of domains $D_i$ being considered, generally three if all the domains are triangular, except at the edges of the image.

It has been seen that the coefficients a, b and c do not depend on either the position or the scale or the orientation on the image of the object used as a support for the domains D and for the ranges R brought into relation with them thanks to the use of barycentric co-ordinates. It would be advantageous to define the translation co-ordinates $t_i$ in order to obtain the same independence. For example, the distance and the direction of the displacement corresponding to this translation could be expressed by taking, as a reference, not the dimensions and the orientation of the image but those of the domain D.

Up to now, the description of the invention has been developed in relation to the indices drawn up according to the fractal properties, since these indices have largely been developed in order to compress and then reconstruct images. However, the invention can be applied to other types of index, since the criteria proposed (points of interest, supplementary points of interest, semi-exhaustive mesh, barycentric co-ordinates) do not depend on the content of the portions of the image. The indices may all naturally express, instead of relationships between the respective portions of the image and others from these portions, the contents of the portions themselves. Thus one can use moments m of order n of barycentric co-ordinates, which can be defined by the equations (6) for a triangular polygon such as one of the ranges R defined by its barycentric co-ordinates $$\left.\begin{array}{l}m_{\hat{a}}^n = \int_R \hat{a}^n \cdot (k - \bar{k}) \\ m_{\hat{a}}^n = \int_R \hat{a}^n \cdot (k - \bar{k}) \\ m_{\hat{a}}^n = \int_R \hat{a}^n \cdot (k - \bar{k})\end{array}\right\} \quad (6)$$

where $\hat{a}^n.(k-\bar{k})$, for example, is the power at the order n of the barycentric co-ordinate $\alpha$ of a point from the range R multiplied by a coefficient k which characterizes this point and can be its level of grayness; $\bar{k}$ designates the mean of this coefficient over all the points of range R.

The index thus contains the moments of the distribution of the image points (pixels) contained in each polygon at different orders, expressed from the barycentric co-ordinates.

In practice, one can insert a weighting through the Gaussian function G($\alpha$, $\beta$, $\gamma$) so as not to favor the influence of points distant from the barycenter, and to thereby reduce the sensitivity of the calculation to errors in the positioning of the vertices of range R; the equations (6) then become (7):

$$m_{\hat{a}}^n = \int_R \hat{a}^n \cdot (k - \bar{k}) \cdot G(\hat{a}, \hat{a}, \tilde{a})$$
$$m_{\hat{a}}^n = \int_R \hat{a}^n \cdot (k - \bar{k}) \cdot G(\hat{a}, \hat{a}, \tilde{a})$$
$$m_{\tilde{a}}^n = \int_{pR} \tilde{a}^n \cdot (k - \bar{k}) \cdot G(\hat{a}, \hat{a}, \tilde{a})$$

(7)

One then makes its moments of order 0 to n correspond to a range R; the vector v of the equation (5) is then replaced by a vector v" (8)

$$V' = \frac{1}{\hat{o}\sqrt{2\tilde{o}}} e - \frac{(\hat{a}^2 + \hat{a}^2 + \tilde{a}^2)}{2\hat{o}^2} [m_{\hat{a}}^i, m_{\hat{a}}^i, m_{\tilde{a}}^i]$$

(8)

The polygons have thus been characterized by using relationships based on the contrast and the luminosity, that is to say on the levels of grayness. It would be possible to characterize them by their color, or indeed by their texture, using a Fourier transform, for example. In all these variants of the method based on the moments, ranges are not related to domains, but the elements of the mesh are only characterized by the properties of their points.

The search for the sample on an image is done in the usual way: the sample is compressed in the same way as the images to obtain a sample index made up of vectors, such as V and V' met with above, that are individually compared with the vectors of the image under consideration. A criterion of similarity for the vectors is introduced in order to decide if a sample vector can be correlated with an image vector. If the search for correlation is positive for a certain number of vectors, it is of interest to determine the spatial organization of these correlated vectors of the sample in order to verify if it coincides sufficiently with that of the corresponding vectors of the image taking into account that the position and the orientation of the sample can be any position and orientation whatsoever on the image if effectively found there. For this the distances and the angles between the two groups of correlated vectors are calculated by the usual mathematical formulae. There are several ways of calculating a vector distance, but the Euclidean distance is generally a good criterion of correlation for this application. A location score is finally calculated by evaluating the correlation of the distances and angles between corresponding vectors between the two indices: the image can be extracted from the data base by the searcher if this score appears promising to him. As has already been indicated, the image can be consulted by any means, depending on whether a digital material representation of it exists in a memory or only the index, the image then being reconstituted by applying the geometric transformation that these vectors define.

The invention may be of interest in a certain number of fields such as remote detection where aerial satellite images are used, medical imaging by tomography, advertising, where it can be used to find again images previously composed, and monitoring and safety applications in order to locate defects or abnormal behavior of systems. More precisely, it can find uses when the volume of recorded images is high or in order to identify a precise detail, a face for example.

What is claimed is:

1. Method of searching for images carrying a sample in a bank of image data, where the images and the sample are represented by indices, the index of the sample is compared successively to the indices of the images, in that the indices are drawn up, after breaking up the images into portions, by expressing properties of the contents of the portions, characterized in that the portions of the images are created: by searching for points of interest of the images, where the contents of the images vary greatly; by joining the points of interest by mesh lines; and by selecting as portions, polygons which have the points of interest as vertices; and in that the indices are drawn up, for each of the portions, from either the content of said portion, or the contents of a defined group of neighboring portions of said portion.

2. Method of searching for an image according to claim 1, characterized in that the neighboring portions of one of the portions are portions which have one polygon side common with said portion.

3. Method of searching for an image according to claim 1, characterized in that, polygons having intersections of the mesh lines as vertices are also selected as portions.

4. Method of searching for an image according to claim 1, characterized in that certain of the portions are at least partially included in other portions.

5. Method of searching for an image according to claim 1, characterized in that the polygons are all triangular.

6. Method of searching for images according to claim 1, characterized in that the portions are created by means of a supplementary and final step, comprising division of heterogeneous portions and fusion of portions having analogous contents.

7. Method of searching for images according to claim 1, characterized in that each of the images is associated with at least one second index, used to reconstruct the image, drawn up by breaking up the images into portions which do not encroach upon one another.

8. Method of searching for an image according to claim 1, characterized in that the properties expressed by the indices are fractal properties of the images which respectively associate said portions with another category of portions, produced by a different breaking up of the images.

9. Method of searching for images according to claim 1, characterized in that the properties expressed by the indices are drawn up in each of the portions by means of values calculated on all the points of said portion using barycentric co-ordinates of said points.

10. Method of searching for images according to claim 1, characterized in that the calculated values are mathematical moments.

11. Method of searching for images according to claim 1, characterized in that the calculated values are mathematical moments.

* * * * *